Sept. 21, 1937.　　　　　G. A. ELLESTAD　　　　　2,093,602
OPHTHALMIC MOUNTING AND METHOD OF MAKING SAME
Filed July 28, 1934　　　2 Sheets-Sheet 1
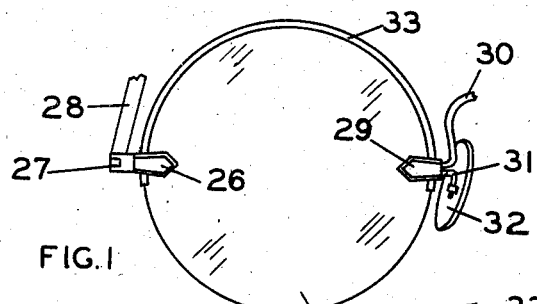
FIG.1
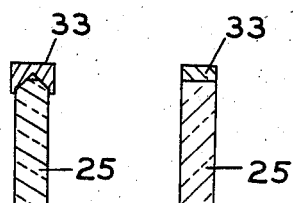
FIG.2　　FIG.3
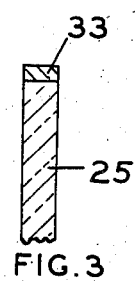
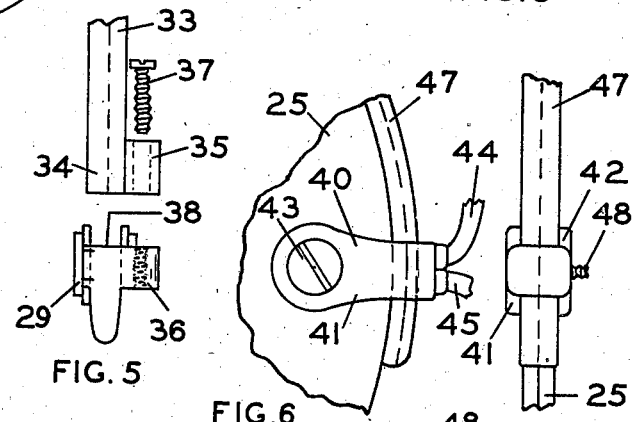
FIG.4　　FIG.5　　FIG.6
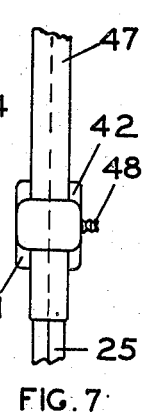
FIG.7
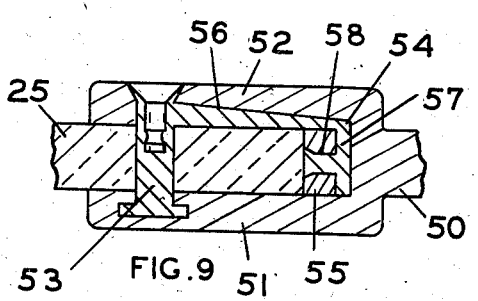
FIG.9
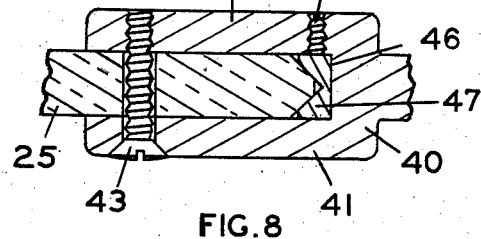
FIG.8
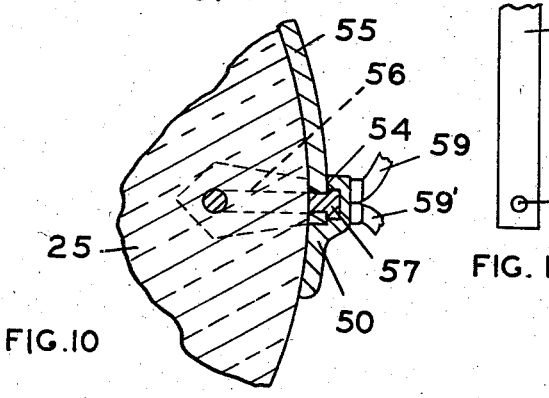
FIG.10　　FIG.11
Gerhard A. Ellestad
INVENTOR Sept. 21, 1937.  G. A. ELLESTAD  2,093,602
OPHTHALMIC MOUNTING AND METHOD OF MAKING SAME
Filed July 28, 1934  2 Sheets-Sheet 2

Gerhard A. Ellestad
INVENTOR

Patented Sept. 21, 1937

2,093,602

UNITED STATES PATENT OFFICE 2,093,602

OPHTHALMIC MOUNTING AND METHOD OF MAKING SAME

Gerhard A. Ellestad, Rochester, N. Y., assignor to Bausch & Lomb Optical Company, Rochester, N. Y., a corporation of New York Application July 28, 1934, Serial No. 737,453

7 Claims. (Cl. 88—47)

This invention relates to ophthalmic mountings and more particularly it has reference to means for holding and mounting lenses.

The types of spectacles and eyeglasses now in wide use may be generally classified as being rimmed or rimless. In the former case the lenses are held in and completely surrounded by eyewires or rims of metallic or non-metallic construction while with the rimless type the lenses are held by fittings or mountings secured at opposite edges of the lens without the use of an eyewire or rim. It has also been proposed to provide a so-called semi-rimless type of spectacle by connecting the usual rimless lens straps with an eyewire or rim which extends partially around the edge of the lens. This construction provides greater strength and affords more protection to the lenses while still retaining some of the advantages of the regular rimless type of spectacle.

In such a semi-rimless type of spectacle the portion of the eyewire is fixedly secured, as by soldering, to the two lens straps which are attached to the lens by the usual screw which passes through a hole in the lens. To properly mount the lenses in such a type of mounting it is necessary that the lens holes be very accurately located and drilled so that the eyewire portion can be snugly positioned against the edge of the lens. If the lens is not accurately edged and drilled to fit the rim and straps the lens will either be so loosely mounted that it will present an unsightly appearance or will be so tightly mounted as to cause chipping of the lens and put an undue strain upon the lens with resulting breakage. In either event the spectacle will be improperly assembled from mechanical and cosmetic standpoints.

One of the objects of my invention is to provide an improved type of lens mounting and method of making same. Another object is to provide an improved and efficient mounting for semi-rimless spectacles and eyeglasses. Still another object is to provide improved means for securing an eyewire to a mounting. A further object is to provide means whereby a semi-rimless type of spectacle can be properly, yet quickly, assembled with a minimum of skill and accuracy. These and other objects and advantages reside in certain novel features of construction, arrangement and combination of parts and in the method of constructing and combining the parts as will hereinafter be more fully described and pointed out in the appended claims.

Referring to the drawings:

Fig. 1 is a fragmentary front view of a pair of spectacles embodying my invention.

Fig. 2 is a fragmentary sectional view through the eyewire and lens.

Fig. 3 is a similar view of a modification.

Fig. 4 is an enlarged front view of my lens strap and eyewire with parts in separated relation.

Fig. 5 is a side view of same.

Fig. 6 is a front view of a modified form of strap embodying my invention.

Fig. 7 is a side view of same.

Fig. 8 is an enlarged horizontal sectional view of same.

Fig. 9 is a horizontal sectional view of another modification.

Fig. 10 is a vertical sectional view of same.

Fig. 11 is a view of the eyewire used in the construction shown in Figs. 9 and 10.

Figure 12:
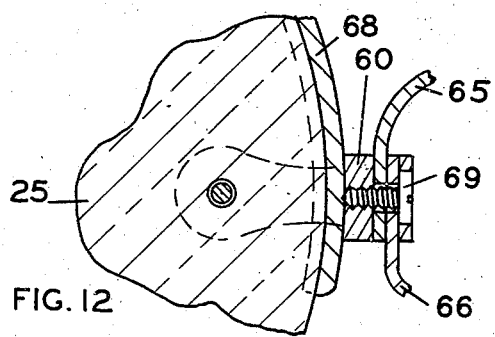
Fig. 12 is a vertical sectional view of another modification.

An embodiment of my invention is illustrated in Fig. 1 wherein I have shown a fragmentary portion of a pair of semi-rimless spectacles comprising the lens 25 carrying at one side or edge thereof the lens strap 26 to which is secured the usual endpiece 27 pivotally supporting temple 28. The inner edge of the lens 25 carries the strap 29 to which is fixedly secured the bridge 30 and the arm 31 carrying the nose-engaging pad or guard 32. The lens straps 26 and 29 may be secured to the lens by any suitable means such, for example, as that disclosed in U. S. Patent No. 1,878,371.

The eyewire or rim 33 partially surrounds the edge of the lens and preferably has one end 34 fixedly secured to the lens strap 26 as by soldering, for example. The other end 34 of the eyewire 33 carries on its rear side a tubular member 35 which is adapted to be brought into alignment with the threaded member 36 secured to the rear side of the strap 29. The screw 37 is positioned within tubular member 35 and cooperates with the threaded member 36 to detachably secure the end 34 of eyewire 33 to the lens strap 29.

In attaching this mounting, the two holes are first drilled in the lens 25. The strap 26, to which the eyewire 33 and endpiece 27 are secured, is then secured to the lens by an element passing through the lens hole. The other strap 29 is then secured at the opposite edge of the lens in a similar manner. The eyewire 33 is then fitted around the edge of the lens so as to provide a snug fit and with the eyewire so held by a suitable clamp or other means the screw 37 is inserted and tightened so as to draw the eyewire firmly down around the upper edge of the lens. In case the eyewire is too long so that it will not fit down snugly in place when the screw is in position, it is only necessary to file off the end of eyewire 34 and tube 35 until they fit snugly and properly against the seat 38 on the strap 29. It will thus be apparent that I am able to provide a semi-rimless spectacle mounting which can be properly attached to the lens without requiring extreme accuracy in locating the holes in the lens. The eyewire 33 may have an internal groove into which the beveled edge of the lens fits, as shown in Fig. 2, or an eyewire 33' having a flat inner surface abutting against a flat edge on the lens may be used as shown in Fig. 3.

Another modified type of lens strap and eyewire connection is shown in Figs. 6–8 wherein 40 indicates the lens strap comprising the front and rear ears 41 and 42, respectively. The lens 25 is positioned between the ears and held in place by a screw 43 which passes through the hole in the lens in the usual manner. The strap 40 also carries the bridge 44 and the guard arm 45. The strap 40 is so constructed that a free space 46 is provided between the inner face of the strap and the edge of the lens when the strap is secured to the lens. The eyewire 47 extends along the edge of the lens and down into the free space 46 so that the eyewire extends below the strap as clearly shown in Figs. 6 and 7. The eyewire 47 is held in position by means of screw 48 which is threaded into the rear ear 42 and adapted to be brought into contact with the eyewire as shown in Fig. 8. The other end of the eyewire 47 is, of course, secured to another strap, not shown, which carries the endpiece just as in Fig. 1. With this construction the other strap, with eyewire 47 soldered or otherwise secured to it, is first attached to the lens, and the strap 40 is also attached to the lens so that the eyewire 47 extends down into the free space 46. The eyewire 47 is then held snugly against the edge of the lens and locked in position by tightening screw 48.

The modification shown in Figs. 9–11 comprises the strap 50 having the front and rear ears 51 and 52, respectively. This strap is attached to lens 25 by fusible retaining means 53 positioned in the lens hole and anchored to the two ears 51 and 52 by a method disclosed in U. S. Patent No. 1,878,371. The strap 50 has on its inner face a recess 54 so that when the strap is mounted on the lens a free space is afforded by recess 54 between the strap and the edge of the lens. The eyewire 55, just as in the case of Fig. 1, has one end secured to a strap, not shown, while the free end projects down into recess 54. The free end of the eyewire 55 may need to be filed away in order to afford a snug fit of the eyewire around the edge of the lens. The rear ear 52 is provided, on its inner face, with a channel or groove 56 which permits some of the fusible retaining means 53 to flow back of the eyewire as at 57 and anchor itself to the eyewire 55 by means of the hole 58 in the eyewire. The free end of eyewire 55 may thereby be fitted to the strap 50 and secured thereto by the same fusible retaining means 53 which holds the mounting on the lens. The strap 50 carries the usual bridge 59 and guard arm 59'.

Figure 13:
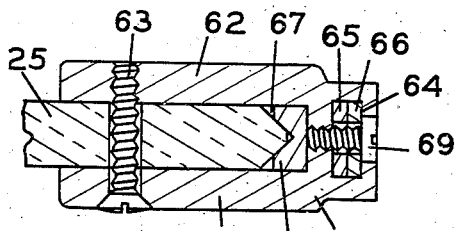
Fig. 13 is a horizontal sectional view of same.

The modification shown in Figs. 12 and 13 comprises the strap 60 having the front and rear ears 61 and 62, respectively, between which is mounted lens 25. The strap may be secured to the lens by any suitable retaining means such as the screw 63. The strap 60 has a box stud structure providing a recess 64 into which the bridge 65 and guard arm 66 are placed. The strap 60 is so constructed that when it is mounted on lens 25 there is provided a free space 67 between the strap and the edge of the lens. The eyewire 68, as in the case of the structure of Fig. 1, has one end secured, as by soldering, to the other strap, not shown, carrying the usual endpiece. The eyewire 68 extends along the edge of the lens 25 and down through the space 67 so that it projects below the strap as shown in Fig. 12. The screw 69 passes through openings in the bridge and guard arm, is threaded into the body of strap 60 and contacts with eyewire 68 so that the screw 69 may be tightened to hold the eyewire 68 in place and also keep the bridge and guard arm in position. In attaching this mounting, the strap, not shown, to which eyewire 68 is soldered, is attached to the lens. The strap 60 is then attached to the lens 25 by means of screw 63, the eyewire is fitted snugly around the upper edge of the lens, the end being inserted in space 67, and it is held in place while screw 69 is tightened.

Figure 14:
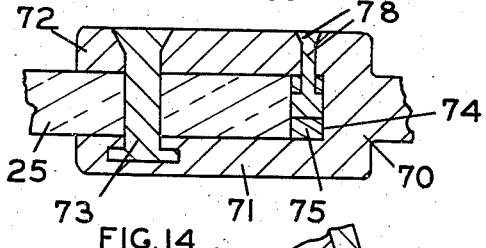
Fig. 14 is a horizontal sectional view of a further modification.
Figure 15:
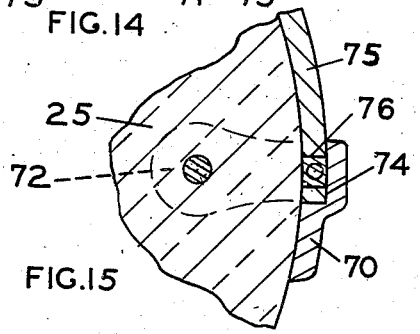
Fig. 15 is a vertical sectional view of same.
Figure 16:
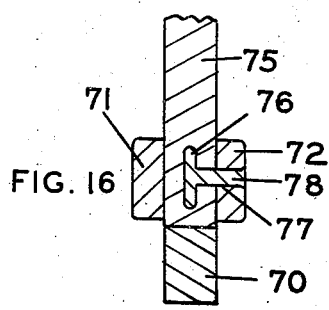
Fig. 16 is another vertical section of same.

In the modification shown in Figs. 14–16 the strap 70 comprises the front and rear ears 71 and 72, respectively. The strap 70 is secured to the lens 25 by any suitable means such as the fusible retaining element 73 which is molded in place under heat and anchored to the two ears 71 and 72. The construction and dimensions of the strap 70 are such that when the strap is attached to the lens a free space 74 is provided between the strap and the edge of the lens. As with the construction shown in Fig. 1 the eyewire 75 has one end secured to a strap, not shown, attached to the lens. The eyewire member 75 extends along the upper edge of the lens and its free end extends down into the recess or free space 74. Adjacent to its free end, the eyewire 75 is provided with a T-shaped recess 76 with a lateral opening rearwardly disposed and adapted to be brought into alignment with an opening 77 in the rear ear 72. When the eyewire 75 is snugly fitted around the edge of the lens, it is secured to the strap 70 by means of a fusible retaining element 78 which is positioned in opening 77 and anchors itself in the recess 76 while in a fluid or plastic state due to heat. Upon cooling, the element 78 will firmly hold the eyewire to the strap. The element 78 may be a non-metallic substance, such as a cellulosic material, or a low melting point metal alloy. The usual bridge and guard arm will, of course, be attached to the strap 70 as by soldering, for example.

Figure 17:
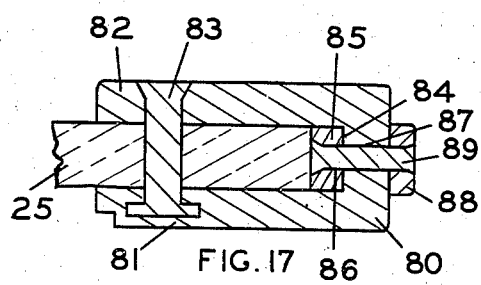
Fig. 17 is a horizontal sectional view of still another modification.
Figures 18, 19:
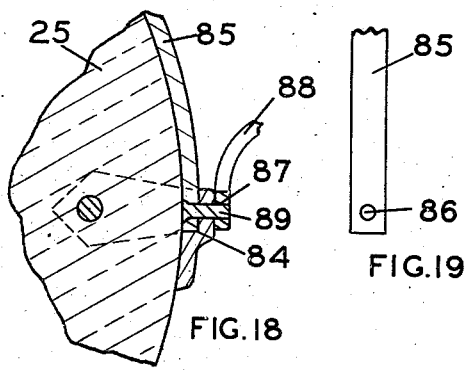
Fig. 18 is a vertical sectional view of same.
Fig. 19 is a view of the eyewire used in the construction shown in Figs. 17 and 18.

The modification shown in Figs. 17–19 comprises the strap 80 having the front and rear ears 81 and 82, respectively. The lens 25 may be attached to the strap by means of any suitable means such as the fusible retaining element 83 which is molded under heat and anchored to the two ears. The strap, on its inner face, has a recess 84 so that when the strap is secured to the lens a free space is provided between the strap and the edge of the lens. With a construction similar to that of Fig. 1 the eyewire 85 is secured to a strap, not shown, and extends along the top edge of the lens with the end of the eyewire positioned in the recess 84. The end portion of the eyewire 85 is provided with a hole 86 so that when the eyewire is snugly fitted along the edge of the lens the hole 86 will be aligned, substantially, with the opening 87 in the strap 80 and the bridge 88. With the eyewire 85 held in position snugly against the edge of the lens, a fusible retaining element 89 is inserted in opening 87. Heat is applied so that the element becomes fluid or plastic and runs into opening 86. Upon cooling the eyewire 85 will be firmly anchored to strap 80.

Figures 20, 21:
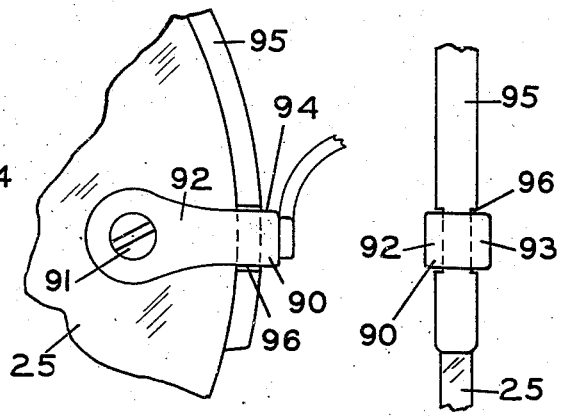
Fig. 20 is a front view of a still further modification.
Fig. 21 is a side view of same.

In still another modification, shown in Figs. 20 and 21, the strap 90 is secured to the lens 25 by means of any suitable retaining means such as the usual screw 91 connecting the two ears 92 and 93. The construction of the strap 90 is such that when it is attached to the lens there is a free space 94 provided between the inner face of the strap and the edge of the lens 25. The eyewire 95 extends along the top edge of the lens and the free end extends below the strap as shown in Figs. 20 and 21. The space 94 is narrower than the eyewire 95 and hence the eyewire has, adjacent its free end, two notched or reentrant portions 96 over which the strap 90 fits. The other end of the eyewire 95 is secured to another strap, not shown, so that the general structure is similar to that shown in Fig. 1. In attaching this type of mounting to the lens, the lens holes are drilled and the other strap, with the eyewire soldered thereto, is secured to the lens by any suitable means. The eyewire 95 is then snugly fitted along the top edge of the lens with the notches 96 positioned so that they will be engaged by strap 90. If necessary the notches may be filed away to provide a proper fit. The strap 90 is then slipped over the edge of the lens and over the notched portions 96 and the screw 91 put in place.

From the foregoing, it will be apparent that I am able to attain the objects of my invention and provide an improved lens mounting and method of making the same. In each of the modifications disclosed, the structure is such that the eyewire may be fitted snugly to the edge of the lens and then held in place while it is secured to the strap. Hence, extreme care and accuracy in drilling the holes in the lens is not required since the free end of the eyewire takes care of any slight variations. With these structures it is possible to provide a semi-rimless eyeglass or spectacle which can be properly mounted with a minimum of skill and accuracy.

Although I have shown means for attaching the free end of the eyewire to the inner straps, carrying the nose bridge, the construction could be altered so the free end could be attached to the outer strap carrying the endpiece. Or, the eyewire could be entirely free and the construction of the straps such that the eyewire could be detachably secured at each end to a strap. In this way, eyewires of different pre-formed shapes and sizes could be secured to the straps by the optician without the use of solder. Although I have shown the rim or eyewire positioned on the upper edge of the lens, the rim could be positioned along the lower lens edge.

In the constructions employing the fusible retaining means I may use any suitable metallic or non-metallic material which will be rendered fluid or plastic under a reasonable amount of heat. In the constructions shown in Figs. 14 and 17 the two fusible members may be simultaneously heated and applied. Or, in the constructions of Figs. 14 and 17 an ordinary screw could be substituted for the fusible members 73 and 83 for holding the lens. In some of the constructions, the free end of the eyewire extends down into a recess in the strap as shown in Figs. 10 and 15, for example, but if desired these recesses could be formed without bottoms so the eyewire would extend down through the recess. In the forms shown in Figs. 6 and 12 the eyewire projects down below the strap and, of course, the portion of the eyewire projecting below the strap could be cut off if desired to improve the appearance of the mounting. Various other modifications and alterations can obviously be made without departing from the spirit of my invention.

I claim:

1. A method of attaching an ophthalmic mounting to a lens which comprises securing one end of a rim member to a lens strap, attaching said strap to a lens by means of a retaining element passing through an opening in the lens, attaching a second strap to a lens by means of a retaining element passing through an opening in the lens and simultaneously securing the other end of said member to the second strap by an integral part of said element.

2. In an ophthalmic mounting the combination of a strap having two ears between which a lens is positioned, an eyewire extending along the edge of the lens to said strap and fusible retaining means for securing the lens to the strap, said retaining means also cooperating with the eyewire to hold it to the strap.

3. In an ophthalmic mounting the combination of a strap positioned on the face of a lens having an opening, said mounting having a portion providing a free space between it and the edge of the lens, an eyewire extending along the edge of the lens and into said space, and fusible retaining means positioned in said opening for securing the lens to the strap, said means having an integral portion extending to said space for securing said eyewire to the mounting.

4. In an ophthalmic mounting the combination of a strap having two spaced ears, a lens having an aperture mounted between said ears, anchoring means on one of the ears, fusible retaining means positioned in said aperture and cooperating with said anchoring means to hold the lens in the strap, said strap having a portion providing a free space between it and the edge of the lens, an eyewire extending along the edge of the lens and into said space, locking means on said eyewire and retaining means integral with said first-named retaining means cooperating with said locking means for securing the eyewire to the strap.

5. In an ophthalmic mounting the combination of two ears positioned on opposite faces of a lens having an opening, anchoring means on each of said ears, a fusible retaining element positioned in said opening and secured to the anchoring means on each ear, said mounting having a portion providing a free space between it and the edge of the lens, an eyewire extending along the edge of the lens and into said space, anchoring means on the part of the eyewire within said space, one of said ears having on its inner face a groove extending from the anchoring means to said space, and fusible retaining means cooperating with the anchoring means on the eyewire to secure the latter to the mounting, said retaining means being integral with said element and connected thereto by a portion which is positioned in said groove.

6. The method of attaching to a lens a strap having spaced ears which comprises placing the lens between said ears so as to leave a free space between the strap and the edge of the lens, placing an eyewire along the edge of the lens so that the eyewire extends into said space and then securing together the assembled eyewire, strap and lens.

7. The steps in the method of attaching an ophthalmic mounting to a lens which comprises providing a strap having spaced ears, placing the lens between said ears so as to provide a free space between the strap and the edge of the lens, positioning an eyewire snugly against the edge of the lens with the eyewire extending into said space and securing together the assembled eyewire, strap and lens.

GERHARD A. ELLESTAD.